W. B. BILLINGS,
Assignor to THE KEROSENE LAMP HEATER CO.
Coal-Oil Stove.
No. 9,121. Reissued Mar. 16, 1880.
*Fig. A.*
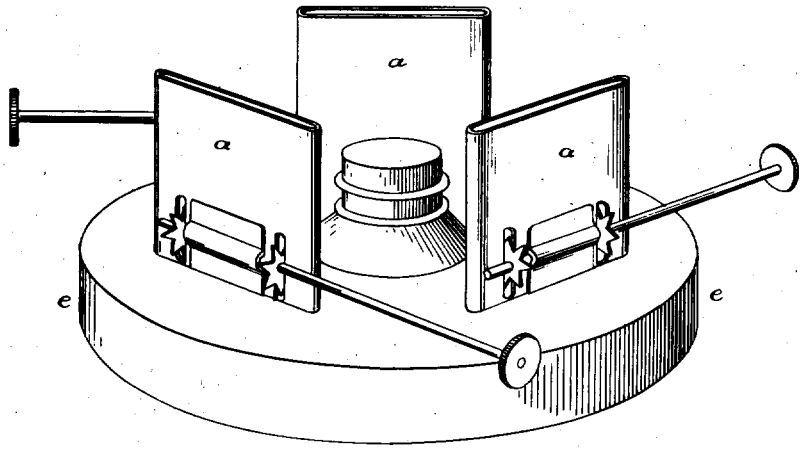
*Fig. D.*
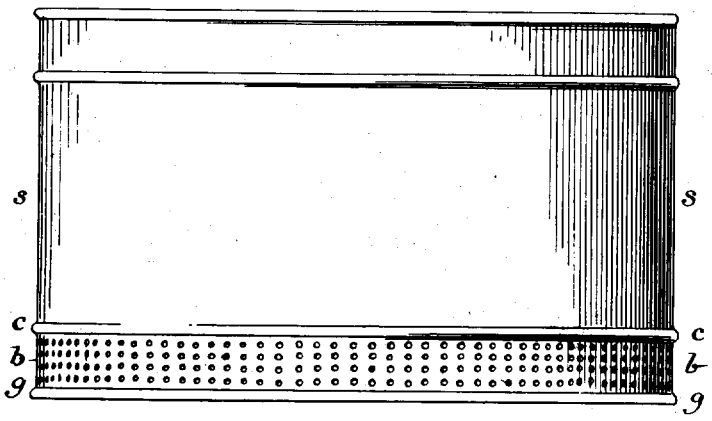
*Witnesses:*
C. Clarence Poole
P. Y. Lee
*Inventor:*
William B. Billings.
by A. Miller attorney

W. B. BILLINGS,
Assignor to THE KEROSENE LAMP HEATER CO.
Coal-Oil Stove.
No. 9,121. Reissued Mar. 16, 1880.
Fig. C.
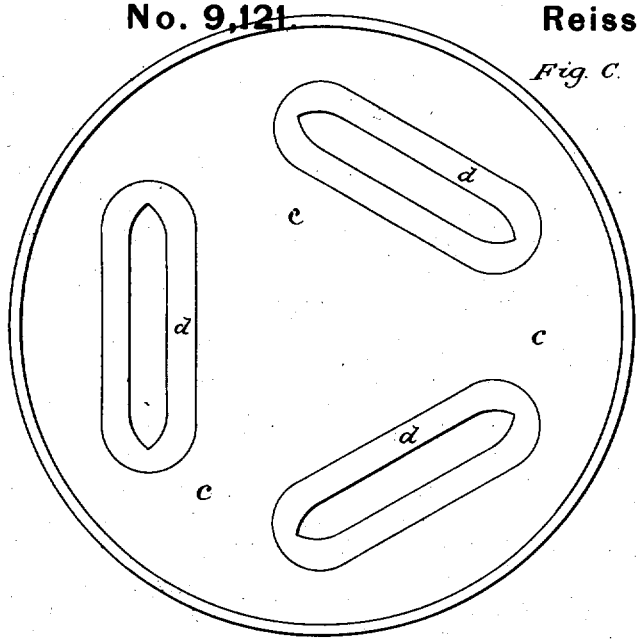
Fig. H.
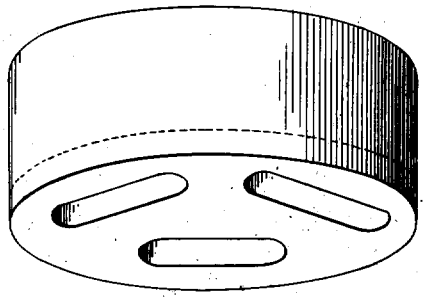
Fig. B.
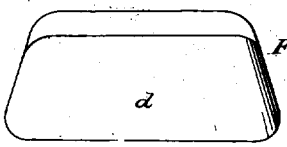
Fig. G
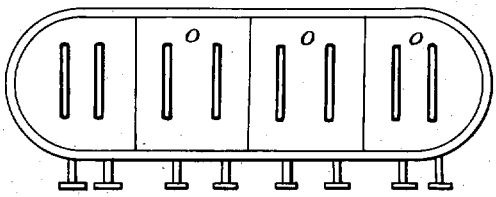
Fig. E.
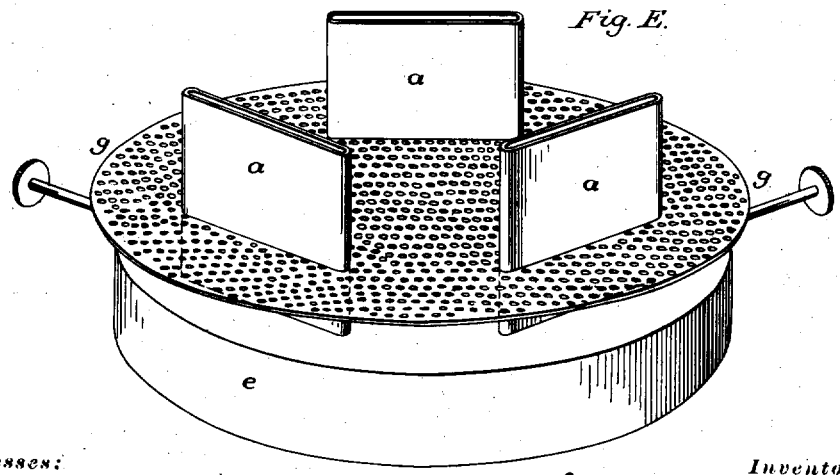
Witnesses:
C. Clarence Poole
B. F. Lee
Inventor:
William B. Billings
by A. Pollok Atty.

W. B. BILLINGS,
Assignor to THE KEROSENE LAMP HEATER CO.
Coal-Oil Stove.
No. 9,121. Reissued Mar. 16, 1880.
Fig. B'
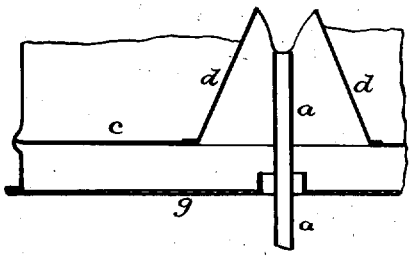
Fig. C'
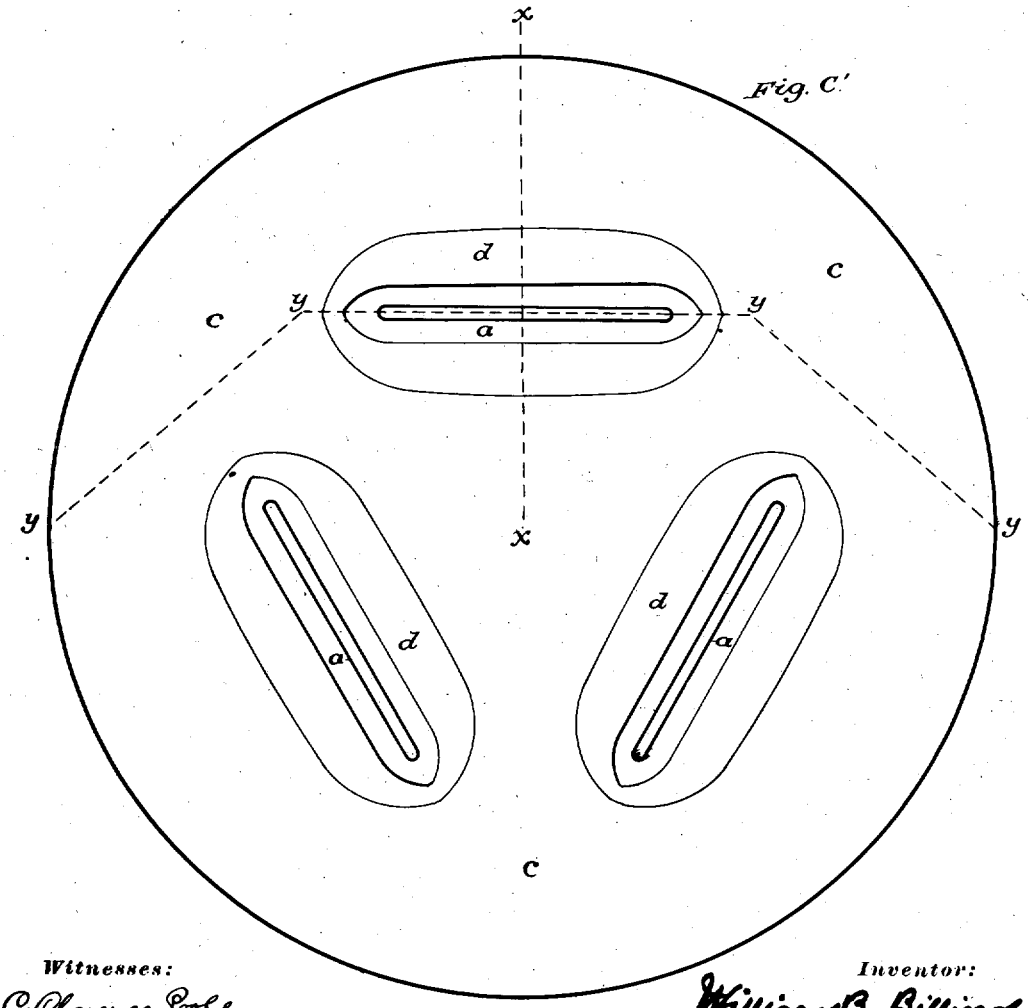
*Witnesses:*
C. Clarence Poole
P. F. Lee
*Inventor:*
William B. Billings
by A. Pollok
atty.

4 Sheets—Sheet 4.
W. B. BILLINGS,
Assignor to THE KEROSENE LAMP HEATER CO.
Coal-Oil Stove.
No. 9,121. Reissued Mar. 16, 1880.
*Fig. B²*
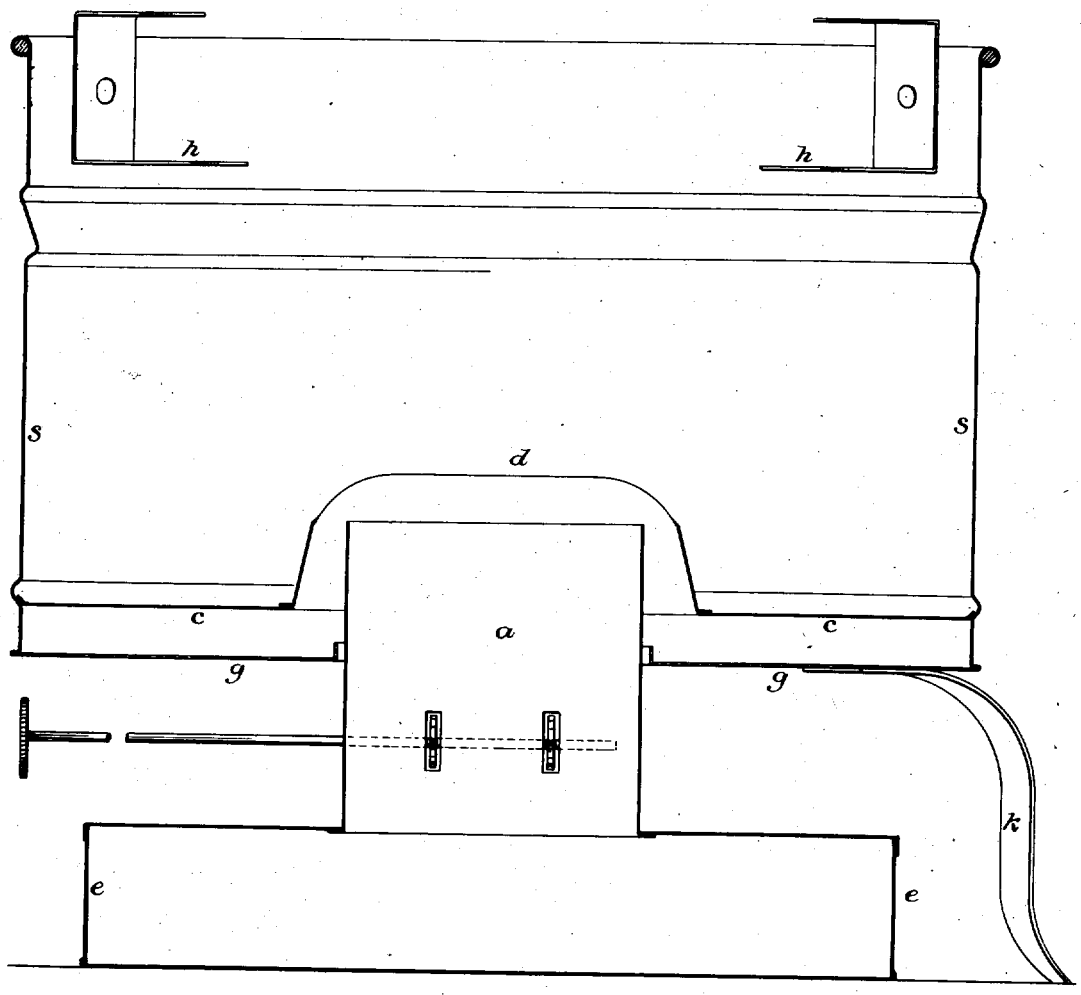
Witnesses:
C. Clarence Poole
W. F. Lee
Inventor:
William B. Billings
by A. Pollok atty.

UNITED STATES PATENT OFFICE.

WILLIAM B. BILLINGS, OF PHILADELPHIA, PENNSYLVANIA, ASSIGNOR TO THE KEROSENE LAMP HEATER COMPANY, OF NEW YORK CITY.

COAL-OIL STOVE.

SPECIFICATION forming part of Reissued Letters Patent No. 9,121, dated March 16, 1880.

Original No. 45,957, dated January 17, 1865. Application for reissue filed February 4, 1880.

*To all whom it may concern:*

Be it known that I, W. B. BILLINGS, of Philadelphia, in the county of Philadelphia and State of Pennsylvania, have invented certain new and useful Improvements in Lamp-Stoves; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention relates to a kerosene or coal oil stove for cooking and heating purposes. The great desideratum in this direction is to produce a kerosene or coal oil stove which shall give out a great heat and at the same time produce a perfect combustion, thus enabling articles to be cooked directly over the flame, as over an open fire. Besides the great end to be attained of producing a hot open fire from petroleum or coal-oil that can be cooked over, it is of great importance to protect the lamp or oil-holder and the oil within it from becoming heated either by radiation or conduction, as the heat generated by a coal-oil stove of my construction is very great.

To enable those skilled in the art to make and use my invention, I will now proceed to describe the construction and mode of operation of a coal-oil stove embodying my improvements, reference being had to the accompanying drawings, and to the letters of reference marked thereon.

The material used may be common tin or sheet-iron. Both of these may be used to advantage, while light iron castings will be found preferable for some parts.

For the oil-holder or lamp of a heater or stove of medium size and capacity I construct a vessel, *e*, (round or any other particular shape desired,) of about seven inches in diameter and two inches high. In the cover or top of this vessel I insert or fasten one or more wick-tubes, *a*—say three wick-tubes—two inches wide, about two inches high, and with a slot so thin that a wick made of stout canton-flannel will just pass through with ease.

The ratchet-wheels and shaft for moving the wick I attach to the wick-tube in the usual manner, with the shaft running near the cover, and a thumb-piece or button on the end of the shaft extending over the edge or side.

The cover may be attached to the body of the oil-vessel by a hinge on one side and a catch on the other, or fitted on like the cover of a common saucepan, or soldered on, in which case a feed-hole must be inserted through which to fill the lamp.

The drawing marked Figure A represents a perspective view of this lamp. The device for guiding the air into the flame and to be placed over the wick-tubes is shown in Fig. B, and is marked *d*, and a top view of three of these air-guides is shown in Figs. C and C′. Fig. B′ shows a central vertical cross-section of the same on the line *x x* in Fig. C′, with adjacent portions of the diaphragm to which it is united, and a similar section of the wick-tube and of the diaphragm *g g*. Fig. B² shows a vertical section of the stove or range body, a central vertical longitudinal section of the air-guide *d* and of the wick-tube *h*, and a vertical section of diaphragms *c* and *g g* and of the lamp-body or oil-holder *e*, these sections being on the line *y y y y*, Fig. C′. I fasten three of these air-guides into the diaphragm *c*, which is about one-fourth of an inch larger in diameter than the lamp shown in Fig. A. These elongated air-guides correspond closely to the shape of the broad flat wick-tubes, so that when they are in position over the wick-tubes they leave a space for the passage of air of nearly equal width all around the wick-tubes. The best result can be obtained by having this diaphragm *c* closed everywhere except at the passages through the air-guides, so that all the air that passes the diaphragm shall be guided to the flame. I construct a cylinder (shown in Fig. D) of the same diameter as the diaphragm *c* and about four inches high. The diaphragm *c* is fastened into this cylinder about one-half an inch from the bottom or lower end. I cut out another diaphragm about one-eighth of an inch larger than the diaphragm *c*, with slots in it, through which the wick-tubes in the lamp *e* will pass. This diaphragm, with the wick-tubes of the lamp passing through it, is marked *g g*.

The horizontal diaphragm *g g* forms the bottom of the cylinder shown in Fig. D, thus forming an air-space of about one-half an inch in height between the diaphragms *g g* and *c*. Either this diaphragm *g g* must be perforated with small holes or the cylinder shown in Fig. D below the diaphragm *c* must be perforated. These perforations in the cylinder shown in drawing D are marked *b b*. Both the diaphragm *g g* and the part of the cylinder marked *b b* may be perforated; but either one being perforated will answer the purpose.

In Fig. D, which is an elevation, the location of the diaphragm *g g* is indicated as being at the bottom of the cylinder, below the part marked *b b*, and the location of diaphragm *c* is indicated by the horizontal lines immediately above the part marked *b b*.

Fig. D shows the flue or chimney closed at its bottom by the air-guide diaphragm *c*, having an air-space at *b b*, immediately below the diaphragm *c*, and between it and the diaphragm *g g*. The part of the apparatus thus shown in Fig. D is next to be placed over the lamp or oil-holder shown in Fig. A in such manner that each wick-tube shall be properly adjusted to its air-guide.

I attach three or more supports or legs to the bottom of the parts shown in Fig. D. One of these supports or legs, *k*, is shown thus attached in Fig. B². The wick-tubes pass through the slots in the diaphragm *g g*, which slots are just large enough to allow the wick-tubes to pass in and out without rubbing.

When the parts shown in Fig. D are placed over the lamp shown in Fig. A the whole should be so adjusted that neither the body of the lamp nor the wick-tubes touch any part of the cylinder shown in Fig. D nor the diaphragm *c*. This is easily done by having the whole rest upon a board or block, the lamp being held in its place by pins, notches, or hooks, and the legs or supports of the parts shown in Fig. D being made fast to the same block or board, and when the whole is thus adjusted the lamp shown in Fig. A is completely insulated from the rest of the stove or heater.

Instead of fastening the diaphragm *g g* to the bottom of the cylinder, it may be fastened directly to the wick-tubes at a distance above the oil-holder, as shown in Fig. E, in which case the flue or chimney shown in Fig. D, with its air-guide diaphragm and part below it marked *b b*, should rest directly upon the diaphragm *g g*, in which case all the parts of the apparatus above the lamp will be supported upon the wick-tubes.

The current of air necessary to obtain perfect combustion, or substantially so, is produced by the part of the cylinder shown in Fig. D marked *s*, which is above the air-guide diaphragm; but this would be too slight a draft for any burner but the one here used, or one constructed substantially like it.

Of course, the top of the cylinder shown in Fig. D should never be entirely closed. A kettle or saucepan may be set into the cylinder an inch or more; but a space must be left between the kettle and cylinder to allow the products of combustion to pass out.

The hooks *h h h*, riveted on the cylinder, as shown in Fig. B², show how a vessel can be supported on top and inside of it.

A stove or range such as I have described can be constructed of any capacity required. Fig. G is a top view illustrating the construction of a stove or range having eight wick-tubes and air-guides. The partitions *o o o* extend from the bottom to within a short distance of the top of the stove-body or range, and separate the stove or range G into four sections containing two air-guides each. These partitions *o o o* are not absolutely necessary to the working of this size of range; but the draft is better, and therefore the combustion more perfect, especially when only a part of the wicks are burning at a time. It renders each section independent of the other. These partitions may be movable.

A stove constructed substantially as above described is efficient and safe. The articles to be cooked can be placed directly over the flame as over an open fire, so that the direct radiated heat from the flame, as well as the pure products of combustion, operate directly upon the things to be cooked.

The elongated air-guides correspond closely to the shape of and embrace the broad, thin, flat wick-tubes, directing the air which passes through the air-guides against the flame, so as to produce perfect combustion, so that it is unnecessary to use the bulb or auxiliary flue or chimney depended upon to give efficiency to the old style of cones previously in use in kerosene-oil heating apparatus. Fish's patent, No. 35,598, June 17, 1862, shows such a bulb, and Eddy's patent, No. 38,102, April 7, 1863, shows such an auxiliary flue.

My peculiar air-guide so combined with a flat wick-tube enables the user to cook near to and over the flame and utilize a maximum amount of the heat.

The perfection of combustion at the air-guides prevents smell and smoke, which would be detrimental to articles broiled or otherwise cooked over the range.

This construction of a coal-oil stove enables one to produce an open fire of any required size and capacity, either by placing all the air-guides in one cylinder, as shown in Fig. C, or by a succession of air-guides placed at the bottom of a succession of flues, as shown in Fig. G.

Fig. G shows a construction representing a multiplication of flues grouped together so as to form a succession of flames, constituting together substantially a single open fire.

The elongated air-guides, conforming closely to the flat wick-tubes, placed side by side, in combination with the flues shown in Fig. G, makes it practicable to construct such a range of great capacity. But one air-guide diaphragm need be used for any number of air-guides.

The horizontal diaphragm *g g* should be of the full area of the range or stove above it, whatever may be the number of wick-tubes that the stove is adapted to receive, thus intercepting the heat from all the parts above toward the oil-holder, while the air-space below this diaphragm allows a circulation of air and serves to keep the oil-holder cool. But one such diaphragm is used in a stove containing any number of air-guides and wick-tubes.

The oil-holder is protected from conducted heat by the elevation of the diaphragm *g g* and all the parts above it above the oil-holder, so as to allow free circulation of air below the diaphragm *g g*, the parts being supported in such a manner as to practically prevent the transmission of heat by conduction to the oil-holder, except through the wick-tubes.

Heretofore the wick-tubes of kerosene-oil burners were secured in caps, usually screw-threaded, which were attached to the vessel holding the oil by means of collars, usually screw-threaded, which were permanently fastened to the vessel. This arrangement would be impracticable for the purpose of coal-oil stoves of adequate heating capacity, for the reason that the wick-tubes could not be enlarged beyond certain limits without unduly separating them, and thereby losing the combined and concentrated effect of two or more burners or flames. Thus for a vessel of a given diameter two wick-tubes, if two be used, would have to be each less than half the diameter of the vessel, and they would have to be separated, so that each burner should occupy an area greater than the circle of which the radius of the vessel is the diameter. A similar result attended the use of conical air-guides.

I have obviated this by attaching the wick-tubes directly to the reservoir without the intermediary of caps and collars, and by the use of elongated air-guides, as shown in the drawings, by which arrangement I am enabled to place wide wick-tubes in a smaller area, dispense with costly and inconvenient contrivances which are liable to get out of order, and by possible leakage are sources of danger, and also secure incidentally full and perfect ventilation around the base of the tubes, and avoid excessive conduction of heat downward.

I will describe another way in which the heat from the stove can be kept from the lamp or oil-holder: Fill the space between the diaphragms *e* and *g g* with a slab of cork-wood, or pack it with granulated cork, asbestus, or any similar non-conductor of heat adapted to the purpose, leaving an opening under each air-guide for air. (See Fig. H.) This plan would be more expensive than the air-chamber, but at the same time efficient.

Under this construction the diaphragm *g g* must be perforated, and the air passes through the diaphragm only under the three openings shown in Fig. H.

The diaphragm *g g* rests directly against the cork-wood or other substance used as a packing, and there will be no air-space above it except the holes shown in Fig. H, which admit the air to the air-guides.

Having thus fully described my said invention and the manner in which the same is or may be carried into effect, I would observe that I am aware that it is not new to combine an air-guide with an annular wick having a wick-inclosed air-passage, in the manner shown in the patent of Thos. G. Clinton, No. 16,112; but such air-guide would obviously be inoperative in connection with kerosene-oil heaters, for the reason that the air-guide does not cause the air to impinge upon the flame, being a mere cylinder, and being shorter than the wick-tube itself.

I am also aware that kerosene-burners have been made with elongated deflectors, as shown in patent to G. Y. Custer, No. 36,206, being of the kind used in so-called "no-chimney burners." Custer shows two deflectors. The one is made to convey the air to and cause it to impinge upon the base of the flame; but it is a mere cap or shell, open on all sides and held in suspension above the wick-tube by lateral supports. Such a construction will not answer the purposes of my invention, because the main body of the air-current does not pass, as it should, between the air-guide and the wick-tube. The other air-guide is not open on the sides, and admits all its air to the flame between the wick-tube and the guide; but the sides of this air-guide are parallel with and do not extend to the top of the wick-tube, and therefore it would be inoperative, for the reasons above indicated, for the purposes of my invention.

I am aware, also, that perforated metal is used in kerosene-burners as an air-distributer, as shown in Eddy's patent, No. 41,496, and in Reichmann's patent, No. 46,141. Such a construction does not answer the purposes of my horizontal diaphragm *g g*, as can be pointedly shown, where several wick-tubes are used in the same oil-holder, in which case, in my stove, the diaphragm *g g* will protect the whole upper surface of the oil-holder from radiated heat, which is the object of the diaphragm, while the perforated metal in a series of burners of the Eddy or Reichmann construction would not afford any such protection.

What I do claim as my invention, and wish to secure by Letters Patent of the United States, is as follows, viz:

1. In a coal-oil stove, the elongated air-guide, in combination with and adapted to conform to the flat wick-tube, substantially as described.

2. In a coal-oil stove, the combination, substantially as described, of the following elements: a kerosene-oil lamp having a flat wick-tube, the elongated air-guide, in combination with and adapted to conform to the flat wick-tube, and a flue or chimney above the air-guide.

3. In a coal-oil stove, the combination, substantially as described, of the following elements: a kerosene-oil lamp having a flat wick-tube, the elongated air-guide, in combination with and adapted to conform to the flat wick-tube, and a flue or chimney above the air-guide, said flue or chimney being closed at its bottom, except at the air-guide opening.

4. In a coal-oil stove, the combination, substantially as described, of the following elements: a kerosene-oil lamp having a flat wick-tube, the elongated air-guide, in combination with and adapted to conform to the flat wick-tube, a flue or chimney above the air-guide, and supports to hold a vessel or thing to be heated over the chimney, so as not to obstruct the draft.

5. In a coal-oil stove, a diaphragm containing two or more of said elongated air-guides, in combination with and adapted to conform to the flat wick-tubes of the kerosene-lamp, substantially as described.

6. In a coal-oil stove, the combination, substantially as described, of the following elements: a kerosene-oil lamp having two or more flat wick-tubes, a diaphragm containing two or more of said elongated air-guides, in combination with and adapted to conform to the flat wick-tubes of the kerosene-lamp, and a flue or chimney above the air-guides.

7. In a coal-oil stove, the diaphragm *c*, containing two or more of said elongated air-guides, in combination with and adapted to conform to the flat wick-tubes of the kerosene-lamp, said diaphragm being closed, as herein shown, except at the air-guide openings.

8. In a coal-oil stove, the combination, substantially as described, of the following elements: a kerosene-oil lamp having two or more flat wick-tubes, the diaphragm *c*, containing two or more of said elongated air-guides, in combination with and adapted to conform to the flat wick-tubes of the kerosene-lamp, said diaphragm being closed, as shown, except at the air-guide openings, and a flue or chimney above the air-guides.

9. In a coal-oil stove, the horizontal diaphragm *g g*, located below the air-guide diaphragm, and having a space for the passage or circulation of air above and below it, substantially as shown and described.

10. In a coal-oil stove, a horizontal perforated diaphragm placed below the stove or range body and the air-guide diaphragm and above the lamp, having a cold-air space between said perforated diaphragm and the top of the lamp, substantially as described.

11. In a coal-oil stove, the combination, substantially as described, of the following elements: a kerosene-oil lamp having a flat wick-tube, the elongated air-guide, in combination with and adapted to conform to the flat wick-tube, a flue or chimney above the air-guide, and the horizontal diaphragm *g g*, having an air-space above and below it.

12. In a coal-oil stove, the combination, substantially as described, of the following elements: a kerosene-oil lamp having a flat wick-tube, the elongated air-guide, in combination with and adapted to conform to the flat wick-tube, a flue or chimney above the air-guide, and supports to hold a vessel to be heated over the chimney so as not to obstruct the draft, and the horizontal diaphragm *g g*, having an air-space above and below it.

13. In a coal-oil stove, the combination, substantially as described, of the following elements: a kerosene-oil lamp having two or more flat wick-tubes, a diaphragm containing two or more air-guides over the flat wick-tubes of the kerosene-lamp, a flue or chimney above the air-guides, and the horizontal diaphragm *g g*.

14. In a coal-oil stove, the combination, substantially as described, of the following elements: a kerosene-oil lamp having two or more flat wick-tubes, a diaphragm containing two or more of said elongated air-guides, in combination with and adapted to conform to the flat wick-tubes of the kerosene-lamp, a flue or chimney above the air-guides, and the horizontal diaphragm *g g*.

15. In a coal-oil stove, the combination, substantially as described, of the following elements: a kerosene-oil lamp having two or more flat wick-tubes, a diaphragm containing two or more air-guides over the flat wick-tubes of the kerosene-lamp, said diaphragm being closed, as shown, except at the air-guide openings, a flue or chimney above the air-guides, and the horizontal diaphragm *g g*.

16. In a coal-oil stove, the combination, substantially as described, of the following elements: a kerosene-oil lamp having two or more flat wick-tubes, a diaphragm containing two or more of said elongated air-guides, in combination with and adapted to conform to the flat wick-tubes of the kerosene-lamp, said diaphragm being closed, as shown, except at the air-guide openings, a flue or chimney above the air-guides, and the horizontal diaphragm *g g*.

17. In a coal-oil stove, the combination, substantially as described, of the following elements: a kerosene-oil lamp containing two or more flat wick-tubes, a diaphragm containing two or more air-guides, and a stove or range body divided by partition or partitions into a succession of flues or chimneys above the air-guides, adapted to convey heat directly to the thing to be heated.

18. In a coal-oil stove, the combination, substantially as described, of the following elements: a kerosene-oil lamp containing two or more flat wick-tubes, a diaphragm containing two or more of said elongated air-guides, in combination with and adapted to conform to the flat wick-tubes of the kerosene-lamp, and a stove or range body divided by partition or partitions into a succession of flues or chimneys above the air-guides, adapted to convey heat directly to the thing to be heated.

19. In a coal-oil stove, the combination, substantially as described, of the following elements: a kerosene-oil lamp containing two or more flat wick-tubes, a diaphragm containing two or more of said elongated air-guides, in combination with and adapted to conform to the flat wick-tubes of the kerosene-lamp, said diaphragm being closed, as shown, except at the air-guide openings, and a stove or range body divided by partition or partitions into a succession of flues or chimneys above the air-guides, adapted to convey heat directly to the thing to be heated.

20. In a coal-oil stove, the combination, substantially as described, of the following elements: a kerosene-oil lamp containing two or more flat wick-tubes, a diaphragm containing two or more air-guides, and a stove or range body divided by partition or partitions into a succession of flues or chimneys above the air-guides, adapted to convey heat directly to the thing to be heated, and the diaphragm *g g*, having an air-space above and below it.

21. In a coal-oil stove, the combination, substantially as described, of the following elements: a kerosene-oil lamp containing two or more flat wick-tubes, a diaphragm containing two or more of said elongated air-guides, in combination with and adapted to conform to the flat wick-tubes of the kerosene-lamp, a stove or range body divided by partition or partitions into a succession of flues or chimneys above the air-guides, adapted to convey heat directly to the thing to be heated, and the diaphragm *g g*.

22. In a coal-oil stove, the combination, substantially as described, of the following elements: a kerosene-oil lamp containing two or more flat wick-tubes, a diaphragm containing two or more of said elongated air-guides, in combination with and adapted to conform to the flat wick-tubes of the kerosene-lamp, said diaphragm being closed, as shown, except at the air-guide openings, a stove or range body divided by partition or partitions into a succession of flues or chimneys above the air-guides, adapted to convey heat directly to the thing to be heated, and the diaphragm *g g*.

23. In a kerosene-oil stove or heater, in combination with the diaphragm *g g*, air guide or guides, and chimney, the flat wick tube or tubes connected with the oil-reservoir without the intermediary of caps and collars, substantially as shown, and for the purposes described.

In testimony that I claim the foregoing I have hereunto set my hand this 23d day of January, 1880.

W. B. BILLINGS.

Witnesses:
JNO. K. HALLOCK,
JAMES NICHS. CALLAN.